Sept. 13, 1927.  R. T. HOSKING  1,642,071
BROILER
Filed Feb. 19, 1926

INVENTOR
R. T. HOSKING
BY
ATTORNEYS

Patented Sept. 13, 1927.

1,642,071

UNITED STATES PATENT OFFICE.

RICHARD T. HOSKING, OF WILMETTE, ILLINOIS, ASSIGNOR TO ELLEN WRIGHT PITCHER, OF SAGINAW, MICHIGAN.

BROILER.

Application filed February 19, 1926. Serial No. 89,383.

My invention relates to improvements in broilers, and it consists in the combinations, constructions, and arrangements herein described and claimed.

An object of my invention is to provide a broiler in which a novel heat-reflecting plate is provided, this plate also serving the additional function of draining the juices from the meat being broiled, into a receptacle which is covered by the reflector plate, whereby the drippings are retained in a receptacle which is practically entirely covered, thus preventing the fire from igniting the drippings, and also from causing the evaporation of large quantities of the drippings.

A further object of my invention is to provide a broiler in which the reflector plate is shaped in a manner to provide a support for a grill, these parts being removably disposed in the broiler, whereby the broiler may be readily cleaned after use.

A further object of my invention is to provide a device of the type described which is circular in shape, thus permitting the device itself to be rotated for changing the position of the meat being broiled with respect to the fire. In types of broilers which are fixed with respect to the fire, the meat must be turned by means of a fork. When the fork is removed from the meat, the juices from the meat will seep through these openings. I overcome this disadvantages by providing a circular broiler which may be rotated at will without the necessity of touching the meat at all during this operation.

Other objects and advantages will appear in the following specification, and the novel features of the invention will be particularly pointed out in the appended claim.

Figure 1:
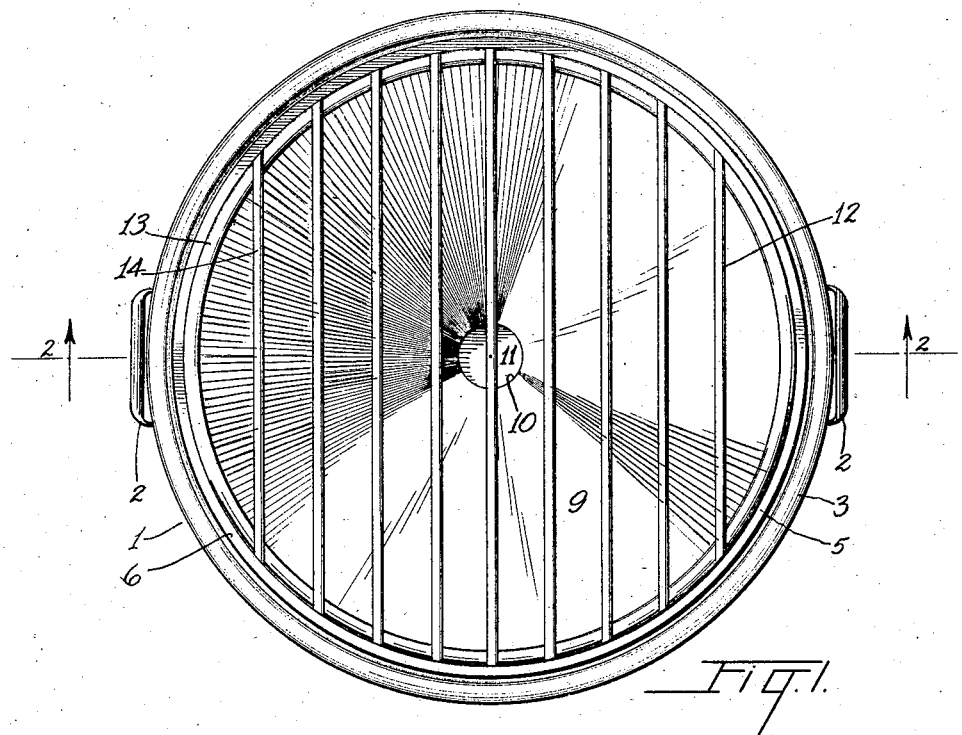
Figure 2:
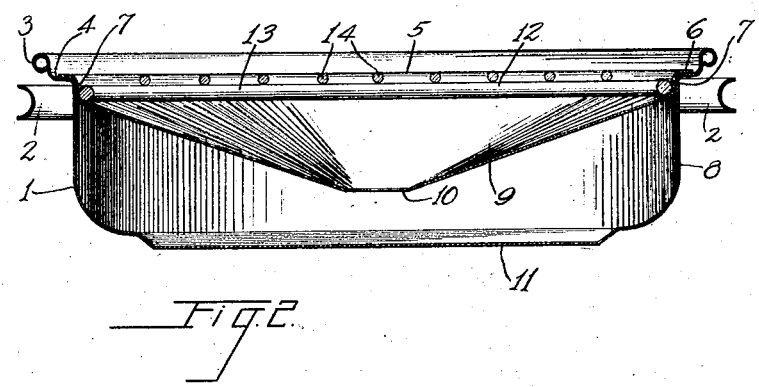

My invention is illustrated in the accompanying drawings, forming part of this application, in which Figure 1 is a top plan view of the device, and Figure 2 is a section along the line 2—2 of Figure 1.

In carrying out my invention, I provide a receptacle 1 having a cross section of the shape shown in Figure 2. This receptacle is circular, as shown in Figure 1, and is provided with handles 2 for permitting the ready moving of the receptacle.

The upper edge of the receptacle is provided with a bead 3 and with a ledge 4 upon which a reflector 5 is removably disposed. The ledge 4 is wide enough to permit the reflector 5 to be slidably mounted on the ledge. This construction permits the ready removal of the reflector 5 when desired.

The special shape of the reflector is shown in Figure 2, and it will be noted from this figure that the reflector 5 has an outwardly extending flange 6 which overlies the ledge 4. The reflector is then bent to form a wall portion 7 that abuts the inner surface of the vertical wall 8 of the receptacle 1 when the reflector is disposed in position. The bottom 9 of the reflector is conical-shaped, and is provided with an opening 10 which is small in comparison with the diameter of the receptacle 1. Figure 2 shows the bottom of the reflector as being spaced above the bottom 11 of the receptacle 1.

The means for supporting the article being broiled consists of a grill 12. This grill is provided with a ring 13 that is removably supported by the reflector 5. It will be noted that the ring rests upon the conical-shaped portion 9 of the reflector and bears against the inner surface of the wall portion 7. The grill 12 carries spaced-apart bars 14. In the present form of the device, I show nine of these bars and space them equal distances apart. It is obvious, however, that the number of the bars may be changed at will without departing from the spirit and scope of my invention. It will be noted that the upper surfaces of the bars 14 are in substantial alignment with the flange 6 and that that portion which bears the bead 3 forms an upstanding flange which will tend to prevent the meat from sliding off from the grill.

From the foregoing description of the various parts of the device, the operation thereof may be readily understood. In using the device, the reflector 5 is disposed in the receptacle 1 in the manner shown in Figure 2, and then the grill 12 is disposed in the reflector 5. The article to be broiled is now placed upon the grill and the entire device disposed beneath the burner in such a manner as to cause the heat from the burner to come in contact with the article being broiled. During the broiling, the juices from the meat will drip upon the conical-shaped portion 9 of the reflector 5, and will be conveyed into the receptacle 1. Figure 2 clearly shows how the receptacle 1 is practically covered, except for the small opening 10, and therefore the drippings in the receptacle will have little chance for evaporation, because they are confined within a practically entirely enclosed space. Moreover, the reflector 5 prevents the fire from igniting the juices which very often occurs in the type of broiler having an open drip pan. The reflector is in reality the means of separating the fire from the drippings.

The novel shape of the reflector permits the reflector to be removably carried by the receptacle 1 and to be supported thereby, and also permits it to receive and support the ring 13 of the grill 12. The reflector 5 also provides a device which is smokeless and odorless when cooking a steak or the like.

The circular shape of the device permits the device to be readily turned, whereby the meat may be changed in its position. This can be accomplished without the necessity of sticking a fork into the meat. As stated, in the first part of the specification, the openings in the meat left by the fork permit the juices to escape from the meat, which partially defeats the broiling operation, since the broiling operation is to quickly sear the surface of the meat. It should be noted that I do not wish to confine myself to any particular shape of broiler, since a small rectangular broiler could be as easily turned as a circular one.

I claim:

A broiler, comprising a receptacle having an outwardly extending ledge near its top, an upstanding flange at the outer portion of the ledge, a reflector having a flange arranged to rest on the ledge, a portion parallel with and in engagement with the sides of the receptacle, and a conical-shaped portion integral with said parallel portion, a grill comprising a ring adapted to rest on the conical-shaped portion of the reflector, the sides of the ring being contiguous to the parallel portion of the reflector, and crossbars carried by the ring, the upper surfaces of the crossbars being substantially in alignment with the upper surface of the flange of the reflector and said reflector having an opening at the apex of its conical portion.

RICHARD T. HOSKING.